United States Patent
Okuno et al.

(10) Patent No.: US 11,332,610 B2
(45) Date of Patent: May 17, 2022

(54) RUBBER COMPOSITION AND CROSSLINKED RUBBER

(71) Applicant: ZEON CORPORATION, Tokyo (JP)

(72) Inventors: Shingo Okuno, Tokyo (JP); Yasuo Tsunogae, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 302 days.

(21) Appl. No.: 16/487,022

(22) PCT Filed: Mar. 16, 2018

(86) PCT No.: PCT/JP2018/010596
§ 371 (c)(1),
(2) Date: Aug. 19, 2019

(87) PCT Pub. No.: WO2018/173974
PCT Pub. Date: Sep. 27, 2018

(65) Prior Publication Data
US 2019/0367726 A1    Dec. 5, 2019

(30) Foreign Application Priority Data

Mar. 24, 2017  (JP) .............................. JP2017-059946

(51) Int. Cl.
*C08L 65/00* (2006.01)
*C08K 5/14* (2006.01)
*C08J 3/24* (2006.01)

(52) U.S. Cl.
CPC .................. *C08L 65/00* (2013.01); *C08J 3/24* (2013.01); *C08K 5/14* (2013.01)

(58) Field of Classification Search
CPC .............. C08L 65/00; C08K 5/14; C08J 3/24
USPC ......................................................... 524/774
See application file for complete search history.

(56) References Cited

U.S. PATENT DOCUMENTS

| | | | |
|---|---|---|---|
| 3,853,830 A | 12/1974 | Minchak | |
| 2006/0211809 A1 | 9/2006 | Kodemura et al. | |
| 2013/0281615 A1* | 10/2013 | Tsunogae | C08G 61/08 |
| | | | 524/588 |
| 2015/0087782 A1 | 3/2015 | Hoshino | |
| 2017/0129990 A1* | 5/2017 | Tsunogae | C08L 45/00 |
| 2017/0247479 A1 | 8/2017 | Kuramoto et al. | |

FOREIGN PATENT DOCUMENTS

| | | | |
|---|---|---|---|
| JP | S50-024400 A | | 3/1975 |
| JP | 50-059446 | * | 5/1975 |
| JP | S50-059446 A | | 5/1975 |
| JP | 2008-074926 A | | 4/2008 |
| JP | 2016-190986 A | | 11/2016 |
| WO | 2005/012427 A1 | | 2/2005 |
| WO | 2013/146660 A1 | | 10/2013 |
| WO | 2016/060267 A1 | | 4/2016 |

OTHER PUBLICATIONS

Jun. 5, 2018 Search Report issued in International Patent Application No. PCT/JP2018/010596.
Nov. 16, 2020 Extended Search Report issued in European Patent Application No. 18771372.2.
Jun. 17, 2021 Office Action issued in Chinese Patent Application No. 201880013500.5.
Aug. 3, 2021 Office Action issued in Japanese Patent Application No. 2019-507643.
Oct. 20, 2021 Office Action issued in Chinese Patent Application No. 201880013500.5.
Jan. 6, 2022 Office Action issued in Chinese Patent Application No. 201880013500.5.
Mar. 8, 2022 Office Action issued in Japanese Patent Application No. 2019-507643.

\* cited by examiner

*Primary Examiner* — Hui H Chin
(74) *Attorney, Agent, or Firm* — Oliff PLC

(57) ABSTRACT

A rubber composition that contains 0.1 to 50 parts by weight of an organic peroxide with respect to 100 parts by weight of a cyclopentene ring-opening polymer.

4 Claims, No Drawings

RUBBER COMPOSITION AND CROSSLINKED RUBBER

TECHNICAL FIELD

The present invention relates to a rubber composition and a crosslinked rubber.

BACKGROUND ART

Conventionally, butadiene rubber has been widely used as a rubber material for forming various rubber components. Butadiene as a raw material of butadiene rubber is produced as a by-product when producing ethylene by cracking naphtha. However, in recent years, as a method of producing ethylene, a method using natural gas such as ethane as a raw material has been expanded, and a decrease in the production amount of butadiene is forecasted. Therefore, various studies are being conducted on using a synthetic rubber that does not use butadiene as a raw material, as a substitute material for butadiene rubber.

One type of synthetic rubber that has been investigated as a substitute material for butadiene rubber is a cyclopentene ring-opening polymer obtained by applying ring-opening polymerization to cyclopentene.

For example, WO 2016/060267 (Patent Document 1) discloses a rubber composition in which silica, and sulfur as a crosslinking agent are compounded with respect to a rubber component containing a cyclopentene ring-opening polymer.

RELATED ART DOCUMENTS

Patent Document

Patent Document 1: WO 2016/060267

SUMMARY OF INVENTION

Problem to be Solved by the Invention

However, a rubber composition using a conventional cyclopentene ring-opening polymer is not necessarily suitable for applications where high heat aging resistance is required for a crosslinked rubber to be obtained.

An object of the present invention is to provide a rubber composition that can provide high heat aging resistance to a crosslinked rubber to be obtained.

Means for Solving the Problem

In order to solve the above problems, according to one aspect of the present invention, a rubber composition contains 0.1 to 50 parts by weight of an organic peroxide with respect to 100 parts by weight of a cyclopentene ring-opening polymer.

Advantageous Effect of the Present Invention

According to one aspect of the present invention, a rubber composition is obtained that can provide high heat aging resistance to a crosslinked rubber to be obtained.

EMBODIMENTS FOR CARRYING OUT THE INVENTION

In the following, embodiments of the present invention will be described in detail.

A rubber composition according to an embodiment of the present invention is a rubber composition containing 0.1 to 50 parts by weight of an organic peroxide with respect to 100 parts by weight of a cyclopentene ring-opening polymer.

A rubber composition of the present embodiment contains a cyclopentene ring-opening polymer. A cyclopentene ring-opening polymer is a polymer containing a repeating unit formed by ring-opening polymerization of cyclopentene as a repeating unit constituting its main chain.

In a cyclopentene ring-opening polymer contained in a rubber composition of the present embodiment, the proportion of repeating units formed by ring-opening polymerization of cyclopentene with respect to all repeating units is favorably greater than or equal to 80 mol %, more favorably greater than or equal to 90 mol %, even more favorably greater than or equal to 95 mol %, and particularly favorably 100 mol % (a polymer virtually constituted only with repeating units formed by ring-opening polymerization of cyclopentene).

A cyclopentene ring-opening polymer contained in a rubber composition of the present embodiment may contain a repeating unit derived from another monomer that is copolymerizable with cyclopentene as long as the characteristics as a cyclopentene ring-opening polymer are maintained. The proportion of repeating units derived from the other copolymerizable monomer with respect to all repeating units is favorably less than or equal to 20 mol %, more favorably less than or equal to 10 mol %, and even more favorably less than or equal to 5 mol %.

As the other monomer that is copolymerizable with cyclopentene, a monocyclic olefin other than cyclopentene, monocyclic diene, monocyclic triene, polycyclic olefin, polycyclic diene, polycyclic triene, or the like may be listed. As a monocyclic olefin other than cyclopentene, cyclopentene having a substituent and cyclooctene that may have a substituent may be exemplified. As a monocyclic diene, 1,5-cyclooctadiene that may have a substituent may be exemplified. As a monocyclic triene, 1,5,9-cyclododecatriene that may have a substituent may be exemplified. Also, as a polycyclic olefin, polycyclic diene, or polycyclic triene, a norbornene compound that may have a substituent such as 2-norbornene, dicyclopentadiene, 1,4-methano-1,4,4a,9a-tetrahydro-9H-fluorene, tetracyclo[$6.2.1.1^{3,6}.0^{2,7}$]dodec-4-ene, or the like may be exemplified.

The molecular weight of the cyclopentene ring-opening polymer is, although not limited in particular, in terms of the polystyrene-converted weight average molecular weight (Mw) measured by gel permeation chromatography, favorably 100,000 to 1,000,000, more favorably 150,000 to 900,000, and even more favorably 200,000 to 800,000. A cyclopentene ring-opening polymer having such a molecular weight enables to obtain a crosslinked rubber that has excellent mechanical strength.

The polystyrene-converted ratio (Mw/Mn) of the weight average molecular weight (Mw) to the number average molecular weight (Mn) of a cyclopentene ring-opening polymer measured by gel permeation chromatography is, although not limited in particular, favorably less than or equal to 4.0, more favorably less than or equal to 3.5, and even more favorably less than or equal to 3.0. Having such Mw/Mn enables to make the mechanical properties of a crosslinked rubber further excellent.

In double bonds present in repeating units constituting a cyclopentene ring-opening polymer, although the cis/trans ratio is not limited in particular, it may be set in a range between 10/90 to 90/10. From the viewpoint of obtaining a crosslinked rubber excellent in low-temperature characteristics, it is favorably in a range between 90/10 and 51/49, and more favorably in a range between 90/10 and 55/45. Further, from the viewpoint of obtaining a crosslinked rubber excellent in fracture strength characteristics, it is favorably in a range between 10/90 and 49/51, and more favorably in a range between 10/90 and 45/55.

Note that a method of adjusting the cis/trans ratio of a cyclopentene ring-opening polymer is not limited in particular; for example, a method may be considered that controls the polymerization conditions when polymerizing cyclopentene to obtain a cyclopentene ring-opening polymer. For example, a higher polymerization temperature when polymerizing cyclopentene results in a higher trans ratio, and a lower monomer concentration in the polymerization solution results in a higher trans ratio.

The glass transition temperature (Tg) of a cyclopentene ring-opening polymer is, although not limited in particular, from the viewpoint of achieving excellent characteristics at a low temperature, favorably lower than or equal to −90° C., more favorably lower than or equal to −95° C., and even more favorably lower than or equal to −98° C.; and normally higher than or equal to −130° C. The glass transition temperature of a cyclopentene ring-opening polymer can be adjusted, for example, by controlling the cis/trans ratio or the like in the double bonds present in the repeating units.

A cyclopentene ring-opening polymer may have a molecular structure constituted with only carbon atoms and hydrogen atoms, or from the viewpoint of improving heat aging resistance, atoms other than carbon atoms and hydrogen atoms may be contained in the molecular structure. More specifically, a cyclopentene ring-opening polymer may contain a modifying group containing an atom selected from among a group consisting of atoms in Group 15 in the periodic table, atoms in Group 16 in the periodic table, and a silicon atom.

As such a modifying group, a modifying group that contains an atom selected from among a group consisting of a nitrogen atom, an oxygen atom, a phosphorus atom, a sulfur atom, and a silicon atom, is favorable; and among these, a modifying group containing an atom selected from among a group consisting of a nitrogen atom, an oxygen atom, and a silicon atom is more favorable, and a modifying group containing a silicon atom is even more favorable.

As a modifying group containing a nitrogen atom, an amino group, pyridyl group, imino group, amido group, group, nitro group, urethane bonding group, or hydrocarbon group containing these groups may be exemplified.

As a modifying group containing an oxygen atom, a hydroxyl group, carboxyl group, ether group, ester group, carbonyl group, aldehyde group, epoxy group, or hydrocarbon group containing these groups may be exemplified.

As a modifying group containing a silicon atom, an alkylsilyl group, oxysilyl group, or hydrocarbon group containing these groups may be exemplified.

As a modifying group containing a phosphorus atom, a phosphate group, phosphino group, or hydrocarbon group containing these groups may be exemplified.

As a modifying group containing a sulfur atom, a sulfonyl group, thiol group, thioether group, or hydrocarbon group containing these groups may be exemplified.

Further, the modifying group may be a modifying group that contains multiple groups described above. Among these, from the viewpoint of improving heat aging resistance, an amino group, pyridyl group, imino group, amido group, hydroxyl group, carboxyl group, aldehyde group, epoxy group, oxysilyl group, or hydrocarbon group containing these groups is favorable; and among these, an oxysilyl group is particularly favorable. Note that an oxysilyl group is a group having a silicon-oxygen bond.

As specific examples of an oxysilyl group, an alkoxysilyl group, aryloxysilyl group, acyloxysilyl group, alkylsiloxysilyl group, arylsiloxysilyl group, or hydroxysilyl group may be listed. Among these, from the viewpoint of having high effect when introduced into a cyclopentene ring-opening polymer, an alkoxysilyl group is favorable.

An alkoxysilyl group is a group formed by bonding one or more alkoxy groups to silicon atoms. As specific examples of an alkoxysilyl group, a trimethoxysilyl group, (dimethoxy) (methyl)silyl group, (methoxy) (dimethyl)silyl group, triethoxy silyl group, (diethoxy) (methyl)silyl group, (ethoxy) (dimethyl) silyl group, (dimethoxy) (ethoxy)silyl group, (methoxy) (diethoxy)silyl group, tripropoxy silyl group, tributoxy silyl group, or the like may be listed.

An aryloxysilyl group is a group formed by bonding one or more aryloxy groups to silicon atoms. As specific examples of an aryloxysilyl group, a triphenoxysilyl group, (diphenoxy) (methyl)silyl group, (phenoxy) (dimethyl)silyl group, (diphenoxy) (ethoxy)silyl group, (phenoxy) (diethoxy)silyl group, or the like may be listed. Note that among these, the (diphenoxy) (ethoxy)silyl group and (phenoxy) (diethoxy)silyl group have an alkoxy group in addition to an aryloxy group, and hence, are also classified as an alkoxysilyl group.

An acyloxysilyl group is a group formed by bonding one or more acyloxy groups to silicon atoms. As specific examples of the acyloxysilyl group, a triacyloxysilyl group, (diacyloxy) (methyl)silyl group, (acyloxy) (dimethyl)silyl group, or the like may be listed.

An alkylsiloxysilyl group is a group formed by bonding one or more alkylsiloxy groups to silicon atoms. As specific examples of an alkylsiloxysilyl group, a tris(trimethylsiloxy) silyl group, trimethylsiloxy(dimethyl)silyl group, triethylsiloxy(diethyl)silyl group, tris(dimethylsiloxy)silyl group, or the like may be listed.

An arylsiloxysilyl group is a group formed by bonding one or more arylsiloxy groups to silicon atoms. As specific examples of an arylsiloxysilyl group, a tris(triphenylsiloxy) silyl group, triphenylsiloxy(dimethyl)silyl group, tris(diphenylsiloxy)silyl group, or the like may be listed.

A hydroxysilyl group is a group formed by bonding one or more hydroxy groups to silicon atoms. As specific examples of a hydroxysilyl group, a trihydroxysilyl group, (dihydroxy)(methyl)silyl group, (hydroxy) (dimethyl)silyl group, (dihydroxy) (ethoxy)silyl group, (hydroxy)(diethoxy)silyl group, or the like may be listed. Among these, a (dihydroxy) (ethoxy)silyl group and a (hydroxy)(diethoxy) silyl group have an alkoxy group in addition to a hydroxy group, and hence, are also classified as an alkoxysilyl group.

In the case where a cyclopentene ring-opening polymer has such a modifying group, the introducing location of the modifying group is, although not limited in particular, from the viewpoint of further enhancing the introducing effect, favorably located at a terminal of a polymer chain.

In the case where a cyclopentene ring-opening polymer has a modifying group at a terminal of a polymer chain, the modifying group may be introduced at only one terminal of the polymer chain (single terminal) or may be introduced at both terminals of the polymer chain (both terminals), and both types of chains may coexist. Furthermore, these may coexist with a native cyclopentene ring-opening polymer in which a specific modifying group is not introduced at a terminal of a polymer chain.

In the case where a cyclopentene ring-opening polymer has a modifying group at a terminal of a polymer chain, the introduction rate of modifying groups at terminals of cyclopentene ring-opening polymer chains is, although not limited in particular, in terms of the percentage value of (the number of terminals of cyclopentene ring-opening polymer chains into which modifying groups are introduced)/(the total number of the cyclopentene ring-opening polymer chains), favorably greater than or equal to 60%, more favorably greater than or equal to 80%, and even more favorably greater than or equal to 100%; and is normally less than or equal to 200%. A higher introduction rate of the modifying group enables to obtain a crosslinked rubber having better heat aging resistance.

Note that a method of measuring the introduction rate of modifying groups into terminals of polymer chains is not limited in particular; for example, it can be obtained from the peak surface ratio corresponding to the modifying groups obtained from $^1$H-NMR spectrometry and the number average molecular weight obtained from gel permeation chromatography.

A method of synthesizing a cyclopentene ring-opening polymer is not limited in particular as long as a target polymer can be obtained, and may be synthesized according to an ordinary method. For example, a cyclopentene ring-opening polymer can be synthesized by a method described below.

That is, a cyclopentene ring-opening polymer can be obtained, for example, by applying ring-opening polymerization to monomers including cyclopentene, under the presence of a polymerization catalyst that contains a transition metal compound (A) in Group 6 in the periodic table and an organoaluminum compound (B) expressed by the following general formula (1).

$$(R^1)_{3-x}Al(OR^2)_x \quad (1)$$

(In the above general formula (1), each of $R^1$ and $R^2$ represents a hydrocarbon group having 1 to 20 carbon atoms, and x ranges 0<x<3.)

A transition metal compound (A) in Group 6 in the periodic table is a compound having a transition metal atom in Group 6 in the periodic table (the long period periodic table, the same applies below), and specifically, a compound having a chromium atom, molybdenum atom, or tungsten atom. Among these, a compound having a molybdenum atom or a compound having a tungsten atom is favorable, and in particular, a compound having a tungsten atom is more favorable from the viewpoint of high solubility with respect to cyclopentene. Also, as a compound having a transition metal atom in Group 6 in the periodic table, table, although not limited in particular, a halide, alcoholate, arylate, oxy compound, or the like of a transition metal atom in Group 6 in the periodic table may be listed; among these, from the viewpoint of high polymerization activity, a halide is favorable.

As a specific example of such a transition metal compound (A) in Group 6 in the periodic table, a molybdenum compound such as molybdenum pentachloride, molybdenum oxotetrachloride, or molybdenum(phenylimide)tetrachloride; a tungsten compound such as tungsten hexachloride, tungsten oxotetrachloride, tungsten(phenylimide)tetrachloride, monocatecholato tungsten tetrachloride, bis(3,5-ditertiarybutyl)catecholato tungsten dichloride, bis(2-chloroethelate) tungsten tetrachloride, or tungsten oxotetraphenolate; or the like may be listed.

The amount of a transition metal compound (A) in Group 6 in the periodic table to be used may be set, in terms of the molar ratio of Group-6 transition metal atoms in a polymerization catalyst to cyclopentene, in a range of normally 1:100 to 1:200,000, favorably 1:200 to 1:150,000, and more favorably 1:500 to 1:100,000. If the amount of a transition metal compound (A) in Group 6 in the periodic table is too low, the polymerization reaction may not proceed sufficiently. On the other hand, if the amount is too high, removal of catalyst residues from an obtained cyclopentene ring-opening polymer may become difficult, and various characteristics of the obtained crosslinked rubber may be reduced.

An organoaluminum compound (B) is a compound expressed by the above general formula (1). As specific examples of a hydrocarbon group having 1 to 20 carbon atoms denoted as $R^1$ and $R^2$ in the above general formula (1), an alkyl group such as a methyl group, ethyl group, isopropyl group, n-propyl group, isobutyl group, n-butyl group, t-butyl group, n-hexyl group, or cyclohexyl group; an aryl group such as a phenyl group, 4-methylphenyl group, 2,6-dimethylphenyl group, 2,6-diisopropylphenyl group, or naphthyl group; or the like may be listed. Note that although the groups denoted as R1 and R2 in the above general formula (1) may be the same or may be different, from the viewpoint of controlling the cis ratio of a cyclopentene ring-opening polymer to be obtained within a favorable range described above, among $R^1$ and $R^2$, at least $R^2$ is favorably an alkyl group formed with continuously bonded four or more carbon atoms, and is particularly favorably an n-butyl group, 2-methyl-pentyl group, n-hexyl group, cyclohexyl group, n-octyl group, or n-decyl group.

Here, in the above general formula (1), x ranges 0<x<3. In other words, in the above general formula (1), the composition ratios of $R^1$ and $OR^2$ can take any values in ranges of 0<3-x<3 and 0<x<3, respectively; however, from the viewpoint of a higher polymerization activity and better controllability on the cis ratio in an obtained cyclopentene ring-opening polymer to fall within a favorable range described above, x ranges favorably 0.5<x<1.5.

An organoaluminum compound (B) expressed by the above general formula (1) can be synthesized, for example, by a reaction of trialkylaluminum with alcohol as expressed in the following general formula (2).

$$(R^1)_3Al + xR^2OH \rightarrow (R^1)_{3-x}Al(OR^2)_x + (R^1)_xH \quad (2)$$

Note that in the general formula (1), x can be controlled discretionarily by specifying the reaction ratio of the corresponding trialkylaluminum and alcohol as expressed in the general formula (2).

Although the amount of an organoaluminum compound (B) to be used varies depending on the type of organoaluminum compound (B) to be used, the amount is, in terms of the molar concentration, favorably 0.1 to 100 times, more favorably 0.2 to 50 times, and even more favorably 0.5 to 20 times the amount of transition metal atoms in Group 6 in the periodic table constituting a transition metal compound (A) in Group 6 in the periodic table. If the amount of the organoaluminum compound (B) to be used is too low, the polymerization activity may become insufficient; or if the amount is too high, side reactions tend to occur easily during the ring-opening polymerization.

A ring-opening polymerization reaction may be carried out without a solvent or in solution. A solvent to be used when carrying out a ring-opening polymerization reaction in a solution simply needs to be a solvent that is inactive in the polymerization reaction, and can dissolve cyclopentene and a polymerization catalyst described above; although not limited in particular, for example, a hydrocarbon solvent, halogen solvent, or the like may be listed. As specific examples of a hydrocarbon solvent, for example, an aromatic hydrocarbon such as benzene, toluene, xylene, or ethylbenzene; an aliphatic hydrocarbon such as n-hexane, n-heptane, or n-octane; an alicyclic hydrocarbon such as cyclohexane, cyclopentane, or methylcyclohexane; or the like may be listed. Also, as specific examples of a halogen-based solvent, an alkyl halogen such as dichloromethane or chloroform; an aromatic halogen such as chlorobenzene or dichlorobenzene; or the like may be listed.

Also, in a ring-opening polymerization reaction system, as a compound that has a modifying group described above and has one olefinic carbon-carbon double bond having metathesis reactivity, a modifying-group-containing olefinic unsaturated hydrocarbon (C) may be present. The presence of such a modifying-group-containing olefinic unsaturated hydrocarbon (C) enables to introduce a modifying group at a terminal of a polymer chain of a cyclopentene ring-opening polymer. For example, in the case of introducing an oxysilyl group at a terminal of a polymer chain of a cyclopentene ring-opening polymer, an oxysilyl-group-containing olefinic unsaturated hydrocarbon may be present in the polymerization reaction system.

As examples of such an oxysilyl-group-containing olefinic unsaturated hydrocarbon that introduces a modifying group only at one of the terminals (one terminal) of a polymer chain of a cyclopentene ring-opened polymer, an alkoxysilane compound such as vinyl(trimethoxy)silane, vinyl(triethoxy)silane, allyl(trimethoxy)silane, allyl (methoxy) (dimethyl)silane, allyl(triethoxy)silane, allyl (ethoxy) (dimethyl)silane, styryl(trimethoxy)silane, styryl (triethoxy)silane, 2-styrylethyl(triethoxy)silane, allyl (triethoxysilylmethyl)ether, or allyl(triethoxysilylmethyl) (ethyl)amine; an aryloxysilane compound such as vinyl (triphenoxy)silane, allyl(triphenoxy)silane, or allyl (phenoxy) (dimethyl)silane; an acyloxysilane compound such as vinyl(triacetoxy)silane, allyl(triacetoxy)silane, allyl (diacetoxy)methylsilane, or allyl(acetoxy)(dimethyl)silane; an alkylsiloxysilane compound such as allyltris(trimethylsiloxy)silane; an arylsiloxysilane compound such as allyltris (triphenylsiloxy)silane; a polysiloxane compound such as 1-allyl heptamethyltrisiloxane, 1-allylnonamethyl tetrasiloxane, 1-allylnonamethyl cyclopentasiloxane, or 1-allyl undecamethyl cyclohexasiloxane; or the like may be listed.

Also, as examples of such an oxysilyl-group-containing olefinic unsaturated hydrocarbon that introduces a modifying group at both of the terminals (both terminals) of a polymer chain of a cyclopentene ring-opened polymer, an alkoxysilane compound such as 1,4-bis(trimethoxysilyl)-2-butene, 1,4-bis(triethoxysilyl)-2-butene, or 1,4-bis (trimethoxysilylmethoxy)-2-butene; an aryloxysilane compound such as 1,4-bis(triphenoxysilyl)-2-butene; an acyloxysilane compound such as 1,4-bis(triacetoxysilyl)-2-butene; an alkylsiloxysilane compound such as 1,4-bis[tris (trimethylsiloxy)silyl]-2-butene; an arylsiloxysilane compound such as 1,4-bis[tris(triphenylsiloxy)silyl]-2-butene; a polysiloxane compound such as 1,4-bis(heptamethyltrisiloxy)-2-butene, or 1,4-bis(undecamethylcyclohexasiloxy)-2-butene; or the like may be listed.

The amount to be used of a modifying-group-containing olefinic unsaturated hydrocarbon (C) such as an oxysilyl-group-containing olefinic unsaturated hydrocarbon may be selected appropriately depending on the molecular weight of a cyclopentene ring-opening polymer to be produced; in terms of the molar ratio to cyclopentene used for polymerization, the amount may be in a range of 1/100 to 1/100,000, favorably 1/200 to 1/50,000, and more favorably 1/500 to 1/10,000. Note that a modifying-group-containing olefinic unsaturated hydrocarbon (C) acts as a molecular weight modifier, in addition to the effect of introducing a modifying group to a terminal of a cyclopentene ring-opening polymer chain.

Alternatively, in the case of not introducing a modifying group described above into a cyclopentene ring-opening polymer, in order to adjust the molecular weight of a cyclopentene ring-opening polymer to be obtained, an olefin compound such as 1-butene, 1-pentene, 1-hexene, or 1-octene; a diolefin compound such as 1,4-pentadiene, 1,4-hexadiene, 1,5-hexadiene, 1,6-heptadiene, 2-methyl-1,4-pentadiene, or 2,5-dimethyl-1,5-hexadiene; or the like may be used as the molecular weight modifier to be added to the polymerization reaction system. The amount of a molecular weight modifier to be used may be appropriately selected in a range similar to that of a modifying-group-containing olefinic unsaturated hydrocarbon (C) described above.

The polymerization reaction temperature is, although not limited in particular, favorably higher than or equal to −100° C., more favorably higher than or equal to −50° C., even more favorably higher than or equal to −20° C., and particularly favorably higher than or equal to 0° C. Also, the upper limit of the polymerization reaction temperature is, although not limited in particular, favorably lower than 100° C., more favorably lower than 90° C., even more favorably lower than 80° C., and particularly favorably lower than 70° C. The polymerization reaction time is, although not limited in particular, favorably 1 minute to 72 hours, and more favorably 10 minutes to 20 hours.

Further, instead of the method using a polymerization catalyst containing a transition metal compound (A) in Group 6 in the periodic table and an organoaluminum compound (B) expressed by the general formula (1), by using a ruthenium carbene complex as the polymerization catalyst, a cyclopentene ring-opening polymer may also be produced by a method of carrying out ring-opening polymerization with monomers including cyclopentene, in the presence of the ruthenium carbene complex.

Such a ruthenium carbene complex is not limited in particular as long as being capable of serving as a catalyst for ring-opening polymerization of cyclopentene. As specific examples of a ruthenium carbene complex favorably used, bis(tricyclohexylphosphine)benzylidene ruthenium dichloride, bis(triphenylphosphine)-3,3-diphenylpropenylidene ruthenium dichloride, (3-phenyl-1H-indene-1-ylidene)bis(tricyclohexylphosphine)ruthenium dichloride, bis(tricyclohexylphosphine)t-butylvinylidene ruthenium dichloride, bis(1,3-diisopropylimidazoline-2-ylidene)benzylidene ruthenium dichloride, bis(1,3-dicyclohexylimidazoline)-2-ylidene)benzylidene ruthenium dichloride, (1,3-dimesitylimidazoline-2-yline) (tricyclohexylphosphine) benzyl ruthenium dichloride, (1,3-dimesitylimidazolidine-2-ylidene) (tricyclohexylphosphine)benzylidene ruthenium dichloride, bis(tricyclohexylphosphine)ethoxymethylidene ruthenium dichloride, (1,3-dimesitylimidazolidine-2-ylidene) (tricyclohexylphosphine)ethoxymethylidene ruthenium dichloride, and the like may be listed.

The amount of a ruthenium carbene complex to be used may be set, in terms of the molar ratio of metallic ruthenium in a catalyst to cyclopentene, in a range of 1:2,000 to 1:2,000,000, favorably 1:5,000 to 1:1,500,000, or more favorably 1:10,000 to 1:1,000,000. If the amount of the ruthenium carbene complex is too low, the polymerization reaction may not proceed sufficiently. On the other hand, if the amount is too high, removal of catalyst residues from an obtained cyclopentene ring-opening polymer may become difficult, and various characteristics may be reduced when a crosslinked rubber is formed.

In the case of using a ruthenium carbene complex as the polymerization catalyst, the ring-opening polymerization reaction may be carried out without a solvent or may be carried out in a solution. As a solvent to be used when carrying out a ring-opening polymerization reaction in a solution, substantially the same solvent (a hydrocarbon solvent, halogen solvents, or the like) can be used as in the case of using a polymerization catalyst containing a transition metal compound (A) in Group 6 in the periodic table and an organoaluminum compound (B) expressed by the above general formula (1).

Also, the polymerization reaction temperature and the polymerization reaction time in the case of using a ruthenium carbene complex as the polymerization catalyst are substantially the same as the polymerization reaction temperature and the polymerization reaction time in the case of using a transition metal compound (A) in Group 6 in the periodic table described above and an organoaluminum compound (B) expressed by the above general formula (1).

Also, if desired, an anti-aging agent such as a phenol-based stabilizer, phosphorus-based stabilizer, sulfur-based stabilizer, or the like may be added to an obtained cyclopentene ring-opening polymer obtained by a method using a polymerization catalyst containing a transition metal compound (A) in Group 6 in the periodic table and an organoaluminum compound (B) expressed by the general formula (1), or a method using a ruthenium carbene complex as the polymerization catalyst. The amount of an anti-aging agent to be added may be appropriately determined depending on the type and the like. Further, an extender oil may be compounded if desired.

In the case where a cyclopentene ring-opening polymer is obtained as a polymer solution, in order to recover the polymer from the polymer solution, a publicly-known recovering method may be adopted. As such a recovery method, for example, a method may be adopted in which after separating the solvent by steam stripping or the like, the solid is separated by filtration, and then, dried to obtain a solid rubber.

A rubber composition of the present embodiment may contain other rubber components in addition to a cyclopentene ring-opening polymer. As the other rubber component other than a cyclopentene ring-opening polymer, for example, natural rubber (NR), isoprene rubber (IR), solution-polymerized SBR (solution-polymerized styrene butadiene rubber), emulsion-polymerized SBR (emulsion-polymerized styrene butadiene rubber), low-cis BR (butadiene rubber), high-cis BR, high-trans BR (70 to 95% content of trans bonds with respect to butadiene unit portions), styrene-isoprene copolymer rubber, butadiene-isoprene copolymer rubber, ethylene propylene diene rubber (EPDM), emulsion-polymerized styrene-acrylonitrile-butadiene copolymer rubber, acrylonitrile-butadiene copolymer rubber, polyisoprene-SBR block copolymer rubber, polystyrene-polybutadiene-polystyrene block copolymer, acrylic rubber, epichlorohydrin rubber, fluororubber, silicone rubber, ethylene-propylene rubber, urethane rubber, or the like may be listed. Among these, natural rubber, isoprene rubber, butadiene rubber, solution-polymerized styrene butadiene rubber, emulsion-polymerized styrene butadiene rubber, and ethylene propylene diene rubber are used favorably. One of these rubbers may be used singly or two or more may be used in combination.

In the case where a rubber composition of the present embodiment contains other rubber components, the content of the cyclopentene ring-opening polymer is favorably greater than or equal to 10 wt %, more favorably greater than or equal to 30 wt %, and even more favorably greater than or equal to 50 wt %, with respect to the entire rubber components as the total of the cyclopentene ring-opening polymer and the other rubber components. On the other hand, the content of rubbers other than the cyclopentene ring-opening polymer is favorably less than or equal to 90 wt %, more favorably less than or equal to 70 wt %, and even more favorably less than or equal to 50 wt %, with respect to the entire rubber components.

A rubber composition according to an embodiment of the present invention includes an organic peroxide in addition to a cyclopentene ring-opening polymer described above. An organic peroxide acts as a crosslinking agent for a cyclopentene ring-opening polymer or a rubber component containing a cyclopentene ring-opening polymer, and enables to enhance the heat aging resistance of a crosslinked rubber to be obtained.

An organic peroxide as such is not limited in particular as long as being an organic compound-based peroxide. As specific examples of such an organic peroxide, a dialkyl peroxide, hydroperoxide, diacyl peroxide, alkyl peroxy ester, peroxy dicarbonate, monoperoxy carbonate, peroxy ketal, ketone peroxide, or the like may be listed. Among these organic peroxides, a dialkyl peroxide or peroxyketal is favorable from the viewpoint of being capable of providing high heat aging resistance to a crosslinked rubber. Further, among dialkyl peroxides, dialkyl peroxides expressed by the following general formulas (3) to (6) are more favorable; and among peroxyketals, peroxyketals expressed by the following general formulas (7) and (8) are more favorable. Among these, dialkyl peroxides expressed by the following formulas (3) to (6) are particularly favorable. Note that one of these organic peroxides described above may be used singly or two or more may be used in combination.

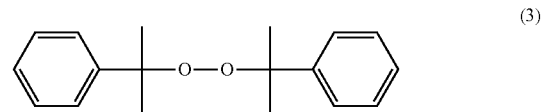

(3)

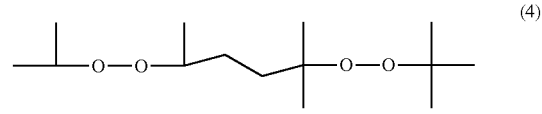

(4)

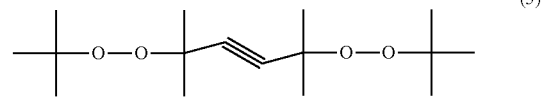

(5)

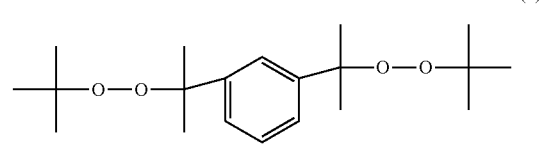

(6)

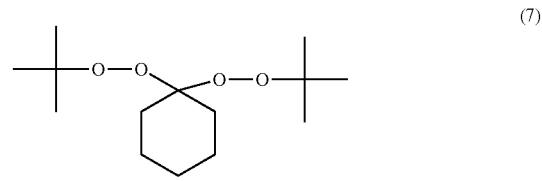

(7)

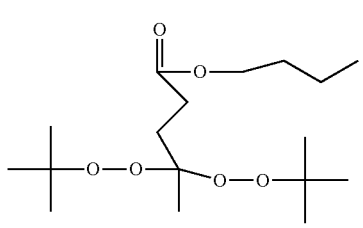 (8)

Also, an organic peroxide has a one-minute half-life temperature of favorably 130° C. to 220° C., more favorably 150° C. to 210° C., and even more favorably 170° C. to 200° C. Here, "one-minute half-life temperature" is a temperature at which half of an organic peroxide decomposes in one minute. By compounding an organic peroxide whose one-minute half-life temperature falls within such a range into a rubber composition, it is possible to obtain a crosslinked rubber having higher heat aging resistance. Note that if the one-minute half-life temperature is too low, the organic peroxide in a rubber composition may be decomposed before crosslinking, which may make the storage stability of the rubber composition inferior and difficult to handle. If the one-minute half-life temperature is too high, the crosslinking temperature needs to be set higher, and the crosslinking temperature may make the rubber deteriorated, and reduce physical properties such as mechanical strength of a crosslinked rubber to be obtained.

The compounding amount of an organic peroxide in a rubber composition of the present embodiment is 0.1 to 50 parts by weight, favorably 0.3 to 20 parts by weight, more favorably 0.5 to 10 parts by weight, and even more favorably 0.5 to 5 parts by weight, with respect to 100 parts by weight of a cyclopentene ring-opening polymer. A compounding amount of an organic peroxide falling in a range described above enables to improve the heat aging resistance of a crosslinked rubber to be obtained.

Also, other than components described above, a rubber composition of the present embodiment may contain compounding agents including a crosslinking agent, a crosslinking accelerator, a crosslinking activator, a surfactant, a process oil (plasticizer), a wax, a filler, and the like according to an ordinary method, each of which may be compounded by a necessary amount as long as the effects of the present invention are not impaired.

As a crosslinking accelerator, for example, a sulfenamide-based crosslinking accelerator such as N-cyclohexyl-2-benzothiazolylsulfenamide, N-t-butyl-2-benzothiazolylsulfenamide, N-oxyethylene-2-benzothiazolylsulfenamide, or N,N'-diisopropyl-2-benzothiazolylsulfenamide; a guanidine-based crosslinking accelerator such as 1,3-diphenylguanidine, 1,3-diorthotolylguanidine, or 1-orthotolylbiguanidine; a thiourea-based crosslinking accelerator; a thiazole-based crosslinking accelerator; a thiuram-based crosslinking accelerator; a dithiocarbamic acid-based crosslinking accelerator; a xanthogenic acid crosslinking accelerator; or the like may be listed. Among these, an agent containing a sulfenamide crosslinking accelerator is particularly favorable. One of these crosslinking accelerators may be used singly or two or more may be used in combination. The compounding amount of a crosslinking accelerator is favorably 0.1 to 15 parts by weight, and more favorably 0.5 to 5 parts by weight, with respect to 100 parts by weight of a cyclopentene ring-opening polymer in a rubber composition.

As a crosslinking activator, for example, a higher fatty acid such as stearic acid, zinc oxide, or the like may be listed. The compounding amount of a crosslinking activator is not limited in particular; in the case of using a higher fatty acid as the crosslinking activator, the compounding amount is favorably 0.05 to 15 parts, and more favorably 0.5 to 5 parts by weight, with respect to 100 parts by weight of a cyclopentene ring-opening polymer in a rubber composition; or in the case of using zinc oxide as the crosslinking activator, the compounding amount is favorably 0.05 to 15 parts, and more favorably 0.5 to 5 parts by weight, with respect to 100 parts by weight of a cyclopentene ring-opening polymer in a rubber composition. One of these crosslinking activators may be used alone or two or more may be used in combination.

As a process oil, mineral oil or synthetic oil may be used. As mineral oil, aroma oil, naphthenic oil, paraffin oil, or the like may be used.

As a filler, either of organic particles or inorganic particles can be used, for example, metal powders such as aluminum powders; inorganic powders of carbon black, hard clay, talc, calcium carbonate, titanium oxide, calcium sulfate, calcium carbonate, aluminum hydroxide, or the like; powders of organic powders such as starch or polystyrene powders; short fibers such as glass fibers (milled fibers), carbon fibers, aramid fibers, potassium titanate whiskers; silica; mica; or the like may be listed. One of these fillers may be used singly or two or more may be used in combination. Although either of organic particles or inorganic particles may be used, inorganic particles are favorable, and among these, silica and carbon black are favorable. Compounding such a filler enables to enhance the mechanical strength of a crosslinked rubber to be obtained.

In the case of using carbon black as the filler, as carbon black to be used, although not limited in particular, furnace black, acetylene black, thermal black, channel black, graphite, or the like may be listed. Among these, it is favorable to use furnace black, and as a specific example, SAF, ISAF, ISAF-HS, ISAF-LS, IISAF-HS, HAF, HAF-HS, HAF-LS, T-HS, T-NS, MAF, FEF, or the like may be listed. One of these may be used alone or two or more may be used in combination.

The nitrogen adsorption specific surface area of carbon black is favorably less than or equal to 200 $m^2/g$, more favorably 5 to 200 $m^2/g$, even more favorably 20 to 150 $m^2/g$. Also, the dibutyl phthalate (DBP) adsorption amount of carbon black as a filler is favorably 5 to 200 ml/100 g, and more favorably 50 to 160 ml/100 g. A specific surface area of carbon black and a dibutyl phthalate adsorption amount falling in respective ranges described above, enable to obtain a rubber composition from which a crosslinked rubber having a good moldability and excellent in the mechanical strength and heat aging resistance is obtained.

The compounding amount of carbon black is favorably 1 to 150 parts by weight, more favorably 2 to 120 parts by weight, even more favorably 5 to 100 parts by weight, particularly favorably 15 to 80 parts by weight, with respect to 100 parts by weight of a cyclopentene ring-opening polymer in a rubber composition. Making the compounding amount of carbon black fall within a range described above enables to obtain a rubber composition from which a crosslinked rubber having a good moldability and excellent in the mechanical strength and heat aging resistance is obtained.

A method of obtaining a rubber composition of the present embodiment is not limited in particular; components simply need to be mixed and kneaded according to an ordinary method; for example, compounding agents such as a filler and the like excluding a crosslinking agent and a crosslinking accelerator are mixed and kneaded with a rubber component such as a cyclopentene ring-opening polymer, and then, the mixed material is mixed with a crosslinking agent and a crosslinking accelerator to obtain a target composition. The mixing temperature of compounding agents and a rubber component excluding a crosslinking agent and a crosslinking accelerator is favorably 70 to 200° C., and more favorably 100 to 180° C. The mixing time is favorably 30 seconds to 30 minutes. The mixed material can be mixed with a crosslinking agent and a crosslinking accelerator at 100° C. or lower, or may favorably be mixed after being cooled down to 80° C. or lower.

A crosslinked rubber according to an embodiment of the present invention is obtained by crosslinking a rubber composition described above. A crosslinking method of crosslinking a rubber composition of the present embodiment is not limited in particular, and may be selected in accordance with the shape, size, and the like of a crosslinked rubber.

A rubber composition is crosslinked by heating the rubber composition. As a heating method, a general method used for crosslinking a rubber may be selected appropriately from among press heating, steam heating, oven heating, hot-air heating, and the like. In this case, a metal mold may be filled with a rubber composition and heated to carry out crosslinking simultaneously with molding, or a rubber composition molded in advance may be heated for crosslinking.

The crosslinking temperature is favorably 120 to 200° C., and more favorably 140 to 180° C.; and the crosslinking time is around 1 to 120 minutes. Further, depending on the shape, size, and the like of a crosslinked rubber, there may be a case where even when the surface is crosslinked, the inside is not sufficiently crosslinked; therefore, the material may be further heated to carry out secondary crosslinking.

A crosslinked rubber of the present embodiment obtained in this way is excellent in heat aging resistance, and hence, can be suitably used for applications where such heat aging resistance is required. Specifically, it can be suitably used in various applications including vibration-proof materials such as an engine mount, strut mount, member mount, suspension bushing, toe correct bushing, lower arm bushing, differential mount, muffler hanger, spring seat, dynamic damper, viscous rubber damper, or center support rubber for a vehicle; a sealing material such as a gasket for a radiator, seal for brake fluid, seal for water-based liquid, or sealing material for a floating roof type tank; a brake accumulator bladder; various belts such as a flat belt (film core flat belt, cord flat belt, laminated flat belt, single flat belt, or the like), V belt (wrapped V belt, low edge V belt, etc.), V-ribbed belt (single V-ribbed belt, double V-ribbed belt, wrapped V-ribbed belt, back rubber V-ribbed belt, upper cog V-ribbed belt, etc.), belt for CVT, timing belt, toothed belt, conveyor belt, or in-oil belt; a protective coating of a wire or cable; an industrial air spring; an adhesive or a strength-enhancing agent for an adhesive; or the like.

EXAMPLES

In the following, the present invention will be described based on further detailed examples; note that the present invention is not limited to these examples. Note that in the following, "parts" and "%" are by weight unless otherwise specified. Also, various tests and evaluations were carried out according to the following methods.

[Molecular Weight of Cyclopentene Ring-Opening Polymer and Butadiene Rubber]

The weight average molecular weight (Mw) and the number average molecular weight (Mn) of a cyclopentene ring-opening polymer and a butadiene rubber were measured by gel permeation chromatography (GPC). The measurement by GPC was performed by using a GPC system (HLC-8220 manufactured by Tosoh Corporation) and two H-type columns (HZ-M manufactured by Tosoh Corporation) connected in series, with tetrahydrofuran as a solvent, at the column temperature of 40° C. As a detector, a differential refractometer (RI-8320 manufactured by Tosoh Corporation) was used. Note that a weight average molecular weight (Mw) and a number average molecular weight (Mn) were measured as polystyrene converted value.

[Glass Transition Temperature (Tg) of Cyclopentene Ring-Opening Polymer]

Using a differential scanning calorimeter (DSC, X-DSC7000 manufactured by Hitachi High-Tech Science Co., Ltd.), a measurement was carried out in a temperature range of −150° C. to 40° C. with a temperature rising rate of 10° C./minute.

[Cis/Trans Ratio of Cyclopentene Ring-Opening Polymer, Vinyl/Cis/Trans Ratio of Butadiene Rubber]

The cis/trans ratio of a cyclopentene ring-opening polymer and the vinyl/cis/trans ratio of a butadiene rubber were determined by $^{13}$C-NMR spectrometry.

[Introduction Rate of Oxysilyl Group in Terminal-Modified Cyclopentene Ring-Opening Polymer]

Based on $^1$H-NMR spectrometry, a ratio of a peak integral value derived from the oxysilyl group to a peak integral value derived from the carbon-carbon double bond in a cyclopentene ring-opening polymer main chain was obtained; then, based on the ratio of the peak integral values and a measured value of the number average molecular weight (Mn) by GPC, an introduction rate of the oxysilyl group was calculated as [a percentage of (the number of terminals of cyclopentene ring-opening polymer chains introduced with the oxysilyl group/the number of terminal-modified cyclopentene ring-opening polymer chains)].

[Tensile Test]

A dumbbell-shaped test piece was obtained by punching out a crosslinked rubber sheet as a sample, in a standardized dumbbell shape No. 6 in a direction parallel to the grain direction. Then, tensile testing was carried out for the obtained test piece, to measure the tensile strength and the elongation at break (may be simply referred to as "elongation", below), by using a tensile tester (product name "TENSOMETER 10K", manufactured by Alpha Technologies, LLC, load cell type, 1 kN) as a testing machine for the obtained dumbbell-shaped test piece, under conditions of 23° C. and 500 mm/min in accordance with JIS K6251: 2010.

[Rates of Change in Tensile Strength and in Elongation Before and After Heat Treatment]

A dumbbell-shaped test piece is obtained in substantially the same way as in the tensile testing described above, and heat treatment was applied to the dumbbell-shaped test piece by using a Geer aging oven (product name "AG-1110", manufactured by Ueshima Seisakusho Co., Ltd.), under conditions of 100° C. and 72 hours, to obtain a test piece after the heat treatment. Then, for the test piece after the heat treatment, tensile testing was carried out in substantially the same way as in the tensile testing described above, to measure the tensile strength and the elongation of the test piece after heat treatment; and from obtained measurement results, a rate of change in tensile strength ΔS and a rate of change in elongation ΔE before and after the heat treatment were calculated according to the following formulas. Note that it is favorable for both the rate of change in tensile strength ΔS and the rate of change in elongation ΔE before and after heat treatment, to have smaller absolute values, because such values indicate smaller changes caused by the heat treatment. Rate of change in tensile strength before and after heat treatment ΔS (%)={tensile strength after heat treatment $S_1$ (MPa)–tensile strength before heat treatment $S_0$ (MPa)}/tensile strength before heat treatment $S_0$ (MPa)×100

Rate of change in elongation at break before and after heat treatment ΔE (%)={elongation at break after heat treatment $E_1$ (MPa)–elongation at break before heat treatment $E_0$ (MPa)}/elongation at break before heat treatment $E_0$ (MPa)×100

[Preparation Example 1] Preparation of diisobutylaluminum mono (n-hexoxide)/toluene solution (2.5% by Weight)

Under a nitrogen atmosphere, 88 parts of toluene and 7.8 parts of a 25.4 wt % triisobutylaluminum/n-hexane solution (manufactured by Tosoh Finechem Corp.) were added into a glass container with a stirrer. Next, the container was cooled down to −45° C. and 1.02 parts of n-hexanol (equimolar to triisobutylaluminum) were slowly dropped while vigorously stirring. Then, the container was left to reach room temperature while stirring, to prepare a diisobutylaluminum mono (n-hexoxide)/toluene solution (2.5 wt %).

[Synthesis Example 1] Production of Both-Terminals-Modified Cyclopentene Ring-Opening Polymer (a1)

Under a nitrogen atmosphere, 87 parts of a 1.0 wt % $WCl_6$/toluene solution and 43 parts of a 2.5 wt % diisobutylaluminum mono (n-hexoxide)/toluene solution prepared in Preparation Example 1 were added into a glass container with a stirrer, which was stirred for 15 minutes to obtain a catalyst solution. Then, under a nitrogen atmosphere, 300 parts of cyclopentene and 1.24 parts of 1,4-bis (triethoxysilyl)-2-butene were added into a pressure-resistant glass reactor with a stirrer, into which 130 parts of the catalyst solution prepared as above were added, to carry out a polymerization reaction at 25° C. for 4 hours. After the 4 hours of polymerization reaction, excess of ethyl alcohol was added into the pressure-resistant glass reactor to stop the polymerization, and then, 0.2 parts of an anti-aging agent (product name "Irganox 1520L", manufactured by Ciba Specialty Chemicals Inc., "Irganox" is a registered trademark) were added per 100 parts of the polymer obtained by the polymerization. Next, the polymer was coagulated with a large amount of ethanol to be recovered, and vacuum dried at 40° C. for 3 days, to obtain 78 parts of a both-terminals-modified cyclopentene ring-opening polymer (a1) in which triethoxysilyl was introduced at both terminals. The weight average molecular weight (Mw) of the obtained both-terminals-modified cyclopentene ring-opening polymer (a1) was 366,000, the glass transition temperature (Tg) was −106° C., and the cis/trans ratio was cis/trans=55/45, and the introduction rate of the oxysilyl group was 143%.

[Synthesis Example 2] Production of Native Cyclopentene Ring-Opening Polymer (a2)

Under a nitrogen atmosphere, 87 parts of a 1.0 wt % $WCl_6$/toluene solution and 43 parts of a 2.5 wt % diisobutylaluminum mono (n-hexoxide)/toluene solution prepared in Preparation Example 1 were added into a glass container with a stirrer, which was stirred for 15 minutes to obtain a catalyst solution. Then, under a nitrogen atmosphere, 300 parts of cyclopentene and 0.26 parts of 1-hexene were added into a pressure-resistant glass reactor with a stirrer, into which 130 parts of the catalyst solution prepared as above were added, to carry out a polymerization reaction at 0° C. for 4 hours. After the 4 hours of polymerization reaction, excess of ethyl alcohol was added into the pressure-resistant glass reactor to stop the polymerization, and then, 0.2 parts of an anti-aging agent (product name "Irganox 1520L", manufactured by Ciba Specialty Chemicals Inc.) were added per 100 parts of the polymer obtained by the polymerization. Next, the polymer was coagulated with a large amount of ethanol to be recovered, and vacuum dried at 40° C. for 3 days, to obtain 74 parts of a native cyclopentene ring-opening polymer (a2). The weight average molecular weight (Mw) of the obtained native cyclopentene ring-opening polymer (a2) was 389,000, the glass transition temperature (Tg) was −110° C., and the cis/trans ratio was cis/trans=81/19.

[Synthesis Example 3] Production of Native Cyclopentene Ring-Opening Polymer (a3)

Under a nitrogen atmosphere, 1000 parts of cyclopentene, 0.42 parts of 1-hexene, and 990 parts of toluene were added into a pressure-resistant glass reactor with a magnetic stirrer. Next, 0.068 parts of (3-phenyl-1H-indene-1-ylidene)bis(tricyclohexylphosphine) ruthenium dichloride dissolved in 10 parts of toluene was added and polymerized at room temperature for 3 hours. After the 3 hours of polymerization reaction, excess of vinyl ethyl ether was added to the pressure-resistant glass reactor to stop the polymerization, and then, 0.2 parts of an anti-aging agent (product name "Irganox 1520L", manufactured by Ciba Specialty Chemicals Inc.) were added per 100 parts of the polymer obtained by the polymerization. Next, the polymer was coagulated with a large amount of ethanol to be recovered, and vacuum dried at 50° C. for 24 hours to obtain 650 parts of a native cyclopentene ring-opening polymer (a3). The weight average molecular weight (Mw) of the obtained native cyclopentene ring-opening polymer (a3) was 434,000, the glass transition temperature (Tg) was −98° C., and the cis/trans ratio was cis/trans=17/83.

[Synthesis Example 4] Production of Terminal-Modified Butadiene Rubber (a4)

In an autoclave with a stirrer, under a nitrogen atmosphere, 5,670 g of cyclohexane and 700 g of 1,3-butadiene were set; then, n-butyllithium was added into it by an amount necessary to neutralize impurities contained in cyclohexane and 1,3-butadiene that would hinder polymerization; further, 8.33 mmol of n-butyllithium was added as a portion to be used for the polymerization reaction, and the polymerization was started at 50° C. Twenty minutes after the start of the polymerization, 300 g of 1,3-butadiene was continuously added over 30 minutes. The maximum temperature in the course of the polymerization reaction was 80° C. After the continuous addition had completed, the polymerization reaction was continued for another 15 minutes; then, having confirmed that the polymerization conversion reached a range of 95% to 100%, 0.333 mmol of 1,6-bis (trichlorosilyl)hexane (corresponding to 0.04 times of the molar equivalent of n-butyllithium used for polymerization) was added in a state of being dissolved in a 40 wt % cyclohexane solution, to be reacted for 30 minutes. Thereafter, 2.92 mmol of a polyorganosiloxane expressed by the following general formula (9) (corresponding to 0.35 times of the molar equivalent of n-butyllithium used for polymerization) was further added in a state of being dissolved in a 20 wt % xylene solution, to be reacted for 30 minutes. Next, 8.33 mmol (corresponding to the molar equivalent of n-butyllithium used for polymerization) of tetramethoxysilane was added in a state of being dissolved in a 25 wt % cyclohexane solution, and allowed to react for 30 minutes. Thereafter, as a polymerization terminator, methanol was added by an amount corresponding to twice the molar equivalent of the used n-butyllithium, to obtain a solution containing a terminal-modified butadiene rubber (a4). Then, 0.2 parts of an anti-aging agent (product name "Irganox 1520L", manufactured by Ciba Specialty Chemicals) per 100 parts of the rubber components were added into the obtained solution, and the solvent was removed by steam stripping; thereafter, the material was vacuum dried at 60° C. for 24 hours, to obtain a terminal-modified butadiene rubber (a4). The weight average molecular weight (Mw) of the obtained terminal-modified butadiene rubber (a4) was 553,000, and the vinyl/cis/trans ratio was vinyl/cis/trans=10/45/45.

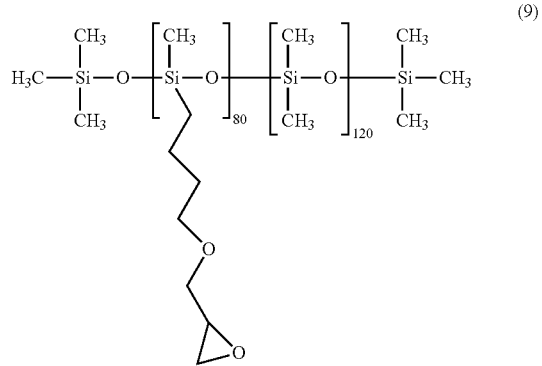

Example 1

In a Banbury-type mixer, 100 parts of the both-terminals-modified cyclopentene ring-opening polymer (a1) obtained in Synthesis Example 1 were masticated for 30 seconds, and then, 2 parts of stearic acid, 3 parts of zinc oxide, 60 parts of carbon black (product name "IRB #8", manufactured by Continental Carbon Company, nitrogen adsorption specific surface area (BET method): 76.3 $m^2/g$), and 15 parts of process oil (product name "Aromax T-DAE", manufactured by JX Nippon Oil & Energy Corporation, "Aromax" is a registered trademark)) were added to be mixed and kneaded at 110° C. for 180 seconds. Thereafter, the compounding agents left on the upper part of the ram were cleaned, and then, the mixture was further mixed and kneaded for 150 seconds, and the kneaded material was discharged from the mixer. Next, the kneaded material was cooled down to room temperature, and then, by using an open roll mixer at 23° C., the obtained kneaded material; 3 parts of dicumyl peroxide as an organic peroxide (dialkyl peroxide) (product name "Parkmill D-40", manufactured by NOF Corporation, purity of 40%, one-minute half-life temperature of 175° C., "Parkmill" is a registered trademark) (1.2 parts as the amount of organic peroxide); and 0.9 parts of N-(tert-butyl)-2-benzothiazolylsulfenamide as a crosslinking accelerator (manufactured by Ouchi Shinko Chemical Co., Ltd., product name "Nocceler NS-P", "Nocceler" is a registered trademark) were mixed and kneaded to obtain a sheet-like polymer composition. Then, the obtained polymer composition was press-crosslinked at 170° C. for 8 minutes to obtain a crosslinked rubber. For the obtained crosslinked rubber, the rate of change in tensile strength before and after heat treatment and the rate of change in elongation at break before and after heat treatment were evaluated according to the methods described above. The results are shown in Table 1.

Example 2

A polymer composition and a crosslinked rubber were obtained in substantially the same way as in Example 1, except that 100 parts of the native cyclopentene ring-opening polymer (a2) obtained in Synthesis Example 2 was used instead of 100 parts of the both-terminals-modified cyclopentene ring-opening polymer (a1) obtained in Synthesis Example 1, and evaluated in substantially the same way. The results are shown in Table 1.

Example 3

A polymer composition and a crosslinked rubber were obtained in substantially the same way as in Example 1, except that 100 parts of the native cyclopentene ring-opening polymer (a3) obtained in Synthesis Example 3 was used instead of 100 parts of the both-terminals-modified cyclopentene ring-opening polymer (a1) obtained in Synthesis Example 1, and evaluated in substantially the same way. The results are shown in Table 1.

Example 4

A polymer composition was obtained in substantially the same way as in Example 1, except that as the organic peroxide (dialkyl peroxide), 1.6 parts of 2,5-dimethyl-2,5-di(t-butylperoxy)hexane (product name "Perhexa 25B-40", manufactured by NOF Corporation, purity of 40%, one-minute half-life temperature of 179° C., "Perhexa" is a registered trademark) (0.64 parts as the amount of organic peroxide) were used instead of dicumyl peroxide. The obtained polymer composition was press-crosslinked at 175° C. for 9 minutes to obtain a crosslinked rubber, and evaluated in substantially the same way as in Example 1. The results are shown in Table 1.

Example 5

A polymer composition was obtained in substantially the same way as in Example 1, except that as the organic peroxide (dialkyl peroxide), 1.6 parts of 2,5-dimethyl-2,5-bis(t-butylperoxy) hexine-(product name "Perhexin 25B-40", manufactured by NOF Corporation, purity of 40%, one-minute half-life temperature of 194° C., "Perhexin" is a registered trademark) (0.64 parts as the amount of organic peroxide) were used instead of dicumyl peroxide. The obtained polymer composition was press-crosslinked at 180° C. for 8 minutes to obtain a crosslinked rubber, and evaluated in substantially the same way as in Example 1. The results are shown in Table 1.

Example 6

A polymer composition was obtained in substantially the same way as in Example 1, except that as the organic peroxide (dialkyl peroxide), 1.9 parts of α,α-di(t-butylperoxy)diisopropylbenzene (product name "Peroxymon F-40", manufactured by NOF Corporation, purity of 40%, one-minute half-life temperature of 175° C., "Peroxymon" is a registered trademark) (0.76 parts as the amount of organic peroxide) were used instead of dicumyl peroxide. The obtained polymer composition was press-crosslinked at 170° C. for 10 minutes to obtain a crosslinked rubber, and evaluated in substantially the same way as in Example 1. The results are shown in Table 1.

Example 7

A polymer composition was obtained in substantially the same way as in Example 1, except that as the organic peroxide (dialkyl peroxide), 1.45 parts of 1,1-di(t-butylperoxy)cyclohexane (product name "Perhexa C-40", manufactured by NOF Corporation, purity of 40%, one-minute half-life temperature of 153° C.) (0.58 parts as the amount of organic peroxide) were used instead of dicumyl peroxide. The obtained polymer composition was press-crosslinked at 170° C. for 11 minutes to obtain a crosslinked rubber, and evaluated in substantially the same way as in Example 1. The results are shown in Table 1.

Example 8

A polymer composition was obtained in substantially the same way as in Example 1, except that as the organic peroxide (dialkyl peroxide), 1.85 parts of N-butyl 4,4-di(t-butylperoxy)valerate (product name "Perhexa V-40", manufactured by NOF Corporation, purity of 40%, one-minute half-life temperature of 172° C.) (0.74 parts as the amount of organic peroxide) were used instead of dicumyl peroxide. The obtained polymer composition was press-crosslinked at 170° C. for 11 minutes to obtain a crosslinked rubber, and evaluated in substantially the same way as in Example 1. The results are shown in Table 1.

Comparative Example 1

A polymer composition was obtained in substantially the same way as in Example 1 except that 1.5 parts of sulfur were used instead of the organic peroxide. The obtained polymer composition was press-crosslinked at 150° C. for 25 minutes to obtain a crosslinked rubber, and evaluated in substantially the same way as in Example 1. The results are shown in Table 1.

Comparative Example 2

A polymer composition was obtained in substantially the same way as in Example 2 except that 1.5 parts of sulfur were used instead of the organic peroxide. The obtained polymer composition was press-crosslinked at 150° C. for 25 minutes to obtain a crosslinked rubber, and evaluated in substantially the same way as in Example 1. The results are shown in Table 1.

Comparative Example 3

A polymer composition was obtained in substantially the same way as in Example 3 except that 1.5 parts of sulfur were used instead of the organic peroxide. The obtained polymer composition was press-crosslinked at 150° C. for 25 minutes to obtain a crosslinked rubber, and evaluated in substantially the same way as in Example 1. The results are shown in Table 1.

Comparative Example 4

A polymer composition was obtained in substantially the same way as in Example 1, except that 100 parts of the terminal-modified butadiene rubber (a4) obtained in Synthesis Example 4 was used instead of 100 parts of the both-terminals-modified cyclopentene ring-opening polymer (a1) obtained in Synthesis Example 1. The obtained polymer composition was press-crosslinked at 170° C. for 5 minutes to obtain a crosslinked rubber, and evaluated in substantially the same way as in Example 1. The results are shown in Table 1.

Comparative Example 5

A polymer composition was obtained in substantially the same way as in Example 1, except that 100 parts of the terminal-modified butadiene rubber (a4) obtained in Synthesis Example 4 was used instead of 100 parts of the both-terminals-modified cyclopentene ring-opening polymer (a1) obtained in Synthesis Example 1, and that an organic peroxide was not used. The obtained polymer composition was press-crosslinked at 150° C. for 25 minutes to obtain a crosslinked rubber, and evaluated in substantially the same way as in Example 1. The results are shown in Table 1.

TABLE 1

|  |  | Examples | | | | | | | |
|---|---|---|---|---|---|---|---|---|---|
|  |  | 1 | 2 | 3 | 4 | 5 | 6 | 7 | 8 |
| Compounds | | | | | | | | | |
| Both-terminals-modified cyclopentene ring-opening polymer (a1) (cis/trans = 55/45) | (parts) | 100 | — | — | 100 | 100 | 100 | 100 | 100 |
| Native cyclopentene ring-opening polymer (a2) (cis/trans = 81/19) | (parts) | — | 100 | — | — | — | — | — | — |
| Native cyclopentene ring-opening polymer (a3) (cis/trans = 17/83) | (parts) | — | — | 100 | — | — | — | — | — |
| Terminal-modified butadiene rubber polymer (a4) | (parts) | — | — | — | — | — | — | — | — |
| Stearic acid | (parts) | 2 | 2 | 2 | 2 | 2 | 2 | 2 | 2 |
| Zinc oxide | (parts) | 3 | 3 | 3 | 3 | 3 | 3 | 3 | 3 |
| Carbon black (IRB#8) | (parts) | 60 | 60 | 60 | 60 | 60 | 60 | 60 | 60 |
| PERCUMYL D-40 | (parts) | 3 | 3 | 3 | — | — | — | — | — |
| PERHEXA 25B-40 | (parts) | — | — | — | 1.6 | — | — | — | — |
| PERHEXYNE 25B-40 | (parts) | — | — | — | — | 1.6 | — | — | — |

TABLE 1-continued

|  |  | 1 | 2 | 3 | 4 | 5 | 6 | 7 | 8 |
|---|---|---|---|---|---|---|---|---|---|
| PEROXYMON F-40 | (parts) | — | — | — | — | — | 1.9 | — | — |
| PERHEXA C-40 | (parts) | — | — | — | — | — | — | 1.45 | — |
| PERHEXA V-40 | (parts) | — | — | — | — | — | — | — | 1.85 |
| Sulfur | (parts) | — | — | — | — | — | — | — | — |
| Crosslinking accelerator (Nocceler NS-P) | (parts) | 0.9 | 0.9 | 0.9 | 0.9 | 0.9 | 0.9 | 0.9 | 0.9 |
| Process oil (Aromax T-DAE) | (parts) | 15 | 15 | 15 | 15 | 15 | 15 | 15 | 15 |
| Evaluation results |  |  |  |  |  |  |  |  |  |
| Tensile strength | (MPa) | 13.2 | 12.3 | 20.9 | 14.2 | 14.9 | 13.7 | 16.3 | 17.6 |
| Elongation | (%) | 340 | 360 | 440 | 440 | 460 | 360 | 650 | 550 |
| 100% tensile stress | (MPa) | 2.34 | 2.08 | 1.91 | 1.95 | 2 | 2.35 | 1.67 | 1.85 |
| 300% tensile stress | (MPa) | 10.8 | 8.32 | 10.6 | 7.43 | 7.43 | 10.4 | 4.84 | 6.64 |
| Rate of change in tensile strength before and after heat treatment (100° C. × 72 h) ΔS | (%) | −6 | −7 | −6 | 6 | −7 | 7 | −9 | −9 |
| Rate of change in elongation at break before and after heat treatment (100° C. × 72 h) ΔE | (%) | −3 | −4 | −5 | 7 | −4 | 0 | −11 | −7 |

|  |  | Comp. Examples | | | | |
|---|---|---|---|---|---|---|
|  |  | 1 | 2 | 3 | 4 | 5 |
| Compounds |  |  |  |  |  |  |
| Both-terminals-modified cyclopentene ring-opening polymer (a1) (cis/trans = 55/45) | (parts) | 100 | — | — | — | — |
| Native cyclopentene ring-opening polymer (a2) (cis/trans = 81/19) | (parts) | — | 100 | — | — | — |
| Native cyclopentene ring-opening polymer (a3) (cis/trans = 17/83) | (parts) | — | — | 100 | — | — |
| Terminal-modified butadiene rubber polymer (a4) | (parts) | — | — | — | 100 | 100 |
| Stearic acid | (parts) | 2 | 2 | 2 | 2 | 2 |
| Zinc oxide | (parts) | 3 | 3 | 3 | 3 | 3 |
| Carbon black (IRB#8) | (parts) | 60 | 60 | 60 | 60 | 60 |
| PERCUMYL D-40 | (parts) | — | — | — | 3 | — |
| PERHEXA 25B-40 | (parts) | — | — | — | — | — |
| PERHEXYNE 25B-40 | (parts) | — | — | — | — | — |
| PEROXYMON F-40 | (parts) | — | — | — | — | — |
| PERHEXA C-40 | (parts) | — | — | — | — | — |
| PERHEXA V-40 | (parts) | — | — | — | — | — |
| Sulfur | (parts) | 1.5 | 1.5 | 1.5 | — | 1.5 |
| Crosslinking accelerator (Nocceler NS-P) | (parts) | 0.9 | 0.9 | 0.9 | 0.9 | 0.9 |
| Process oil (Aromax T-DAE) | (parts) | 15 | 15 | 15 | 15 | 15 |
| Evaluation results |  |  |  |  |  |  |
| Tensile strength | (MPa) | 16.1 | 14.4 | 22.6 | 11.8 | 17.8 |
| Elongation | (%) | 380 | 420 | 490 | 210 | 510 |
| 100% tensile stress | (MPa) | 3.11 | 2.65 | 2.46 | 3.58 | 2.19 |
| 300% tensile stress | (MPa) | 11.9 | 9.5 | 11.8 | — | 8.4 |
| Rate of change in tensile strength before and after heat treatment (100° C. × 72 h) ΔS | (%) | −12 | −10 | −13 | −48 | −24 |
| Rate of change in elongation at break before and after heat treatment (100° C. × 72 h) ΔE | (%) | −42 | −40 | −49 | −29 | −53 |

As shown in Table 1, each of the crosslinked rubbers (Examples 1 to 8) obtained by crosslinking a rubber composition containing a cyclopentene ring-opening polymer and an organic peroxide has a smaller absolute value of the rate of change in tensile strength ΔS and a smaller absolute value of the rate of change in elongation at break ΔE before and after the heat treatment than in the cases of using sulfur instead of an organic peroxide (Comparative Examples 1 to 3).

Also, each of the crosslinked rubbers (Examples 1 to 8) obtained by crosslinking a rubber composition containing a cyclopentene ring-opening polymer and an organic peroxide, has a considerably smaller absolute value of the rate of change in tensile strength ΔS and a considerably smaller absolute value of the rate of change in elongation at break ΔE before and after the heat treatment than the crosslinked rubbers obtained by using butadiene as a rubber component (Comparative Examples 4 and 5).

From these results, it was found that a crosslinked rubber obtained by crosslinking a rubber composition containing a cyclopentene ring-opening polymer and an organic peroxide is greatly excellent in the heat aging resistance.

As above, embodiments of the present invention have been described with reference to examples. Note that the present embodiment is not limited to specific embodiments or examples, and various modifications and changes can be made within the scope of the invention as described in the claims.

This international application claims priority based on Japanese Patent Application No. 2017-59946 filed on Mar. 24, 2017, the entire contents of which are incorporated herein by reference.

The invention claimed is:
1. A rubber composition comprising:
0.1 to 50 parts by weight of an organic peroxide with respect to 100 parts by weight of a cyclopentene ring-opening polymer,
wherein the organic peroxide is at least one selected from the group consisting of dialkyl peroxide, hydroperoxide, diacyl peroxide, alkyl peroxy ester, peroxy dicarbonate, monoperoxy carbonate, peroxy ketal, and ketone peroxide, and wherein if the organic peroxide includes dialkyl peroxide, the dialkyl peroxide is at least one selected from the group consisting of general formulas (4)-(6):

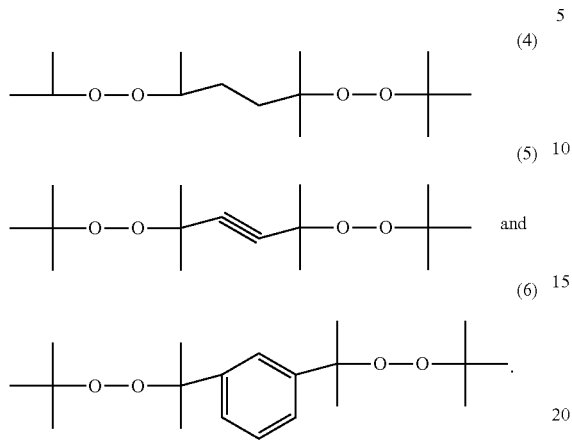

2. The rubber composition as claimed in claim 1, wherein the organic peroxide has a one-minute half-life temperature within 130° C. to 220° C.

3. A crosslinked rubber obtained by crosslinking the rubber composition as claimed in claim 1.

4. A crosslinked rubber obtained by crosslinking the rubber composition as claimed in claim 2.

* * * * *